(12) United States Patent
Ignatchenko

(10) Patent No.: US 9,141,783 B2
(45) Date of Patent: Sep. 22, 2015

(54) SYSTEMS, METHODS AND APPARATUSES FOR THE APPLICATION-SPECIFIC IDENTIFICATION OF DEVICES

(71) Applicant: OLogN Technologies AG, Triesen/FL (LI)

(72) Inventor: Sergey Ignatchenko, Innsbruck (AT)

(73) Assignee: OLogN Technologies AG, Triesen/FL (LI)

( * ) Notice: Subject to any disclaimer, the term of this patent is extended or adjusted under 35 U.S.C. 154(b) by 0 days.

(21) Appl. No.: 13/926,533

(22) Filed: Jun. 25, 2013

(65) Prior Publication Data

US 2013/0346760 A1    Dec. 26, 2013

Related U.S. Application Data

(60) Provisional application No. 61/664,465, filed on Jun. 26, 2012.

(51) Int. Cl.
*G06F 21/44* (2013.01)
*G06F 21/60* (2013.01)

(52) U.S. Cl.
CPC .............. *G06F 21/44* (2013.01); *G06F 21/602* (2013.01)

(58) Field of Classification Search
CPC ... H04L 63/0823; H04L 9/3263; G06F 21/44; G06F 21/602
USPC ............................ 713/190, 189, 156; 380/277
See application file for complete search history.

(56) References Cited

U.S. PATENT DOCUMENTS

| | | | |
|---|---|---|---|
| 7,346,774 B2 | 3/2008 | Douceur et al. | |
| 7,443,985 B2 | 10/2008 | Krishnaswamy et al. | |
| 8,014,530 B2 | 9/2011 | Brickell et al. | |
| 8,452,970 B2 * | 5/2013 | Little et al. ..................... | 713/176 |
| 2004/0181672 A1 | 9/2004 | Ferri et al. | |
| 2006/0093149 A1 | 5/2006 | Zhu et al. | |
| 2006/0098824 A1 | 5/2006 | Mao | |
| 2008/0126806 A1 | 5/2008 | Morten | |
| 2010/0275026 A1 * | 10/2010 | McLean ........................ | 713/176 |
| 2011/0093714 A1 | 4/2011 | Schaecher et al. | |

(Continued)

FOREIGN PATENT DOCUMENTS

| | | |
|---|---|---|
| EP | 0 679 977 A1 | 4/1995 |
| EP | 1 643 675 A1 | 8/2005 |

OTHER PUBLICATIONS

Bao, "A Generic Method of Detecting Private Key Disclosure in Digital Signature Schemes," Communications and Networking in China, 2010 5th International ICST Conference, p. 1-5 (2010).

(Continued)

*Primary Examiner* — Matthew Smithers
(74) *Attorney, Agent, or Firm* — Arnold & Porter LLP

(57) ABSTRACT

The systems, methods and apparatuses described herein provide a computing environment that manages application specific identification of devices. An apparatus according to the present disclosure may comprise a non-volatile storage storing identifier (ID) base data and a processor. The processor may be configured to validate a certificate of an application being executed on the apparatus. The certificate may contain a code signer ID for a code signer of the application. The processor may further be configured to receive a request for a unique ID of the application, generate the unique ID from the code signer ID and the ID base data and return the generated unique ID.

32 Claims, 4 Drawing Sheets

(56) References Cited

U.S. PATENT DOCUMENTS

| | | |
|---|---|---|
| 2011/0154043 A1 | 6/2011 | Lim et al. |
| 2011/0211699 A1 | 9/2011 | Ma et al. |
| 2013/0078949 A1* | 3/2013 | Pecen et al. .................. 455/411 |

OTHER PUBLICATIONS

International Search Report and Written Opinion dated Sep. 16, 2013 from the International Searching Authority regarding Application No. PCT/IB2013/001348.

Karn et al., "Photuris: Extended Schemes and Privacy Protection," draft-simpson-photuris-schemes-01.txt, p. 1-8 (1997).

Menezes et al., "Handbook of Applied Cryptography, Public-key certificates," CRC Press, XP002674562, p. 559-561 (1997).

Silva et al., "Identify-Based Key Management in Mobile Ad Hoc Networks: Techniques and Applications," *IEEE Wireless Communications*, 15(5): 46-52 (2008).

Tan, "An Improved Identity-based Group Signature Scheme," 2009 International Conference on Computational Intelligence and Security, p. 423-427 (2009).

* cited by examiner

SYSTEMS, METHODS AND APPARATUSES FOR THE APPLICATION-SPECIFIC IDENTIFICATION OF DEVICES

RELATED APPLICATIONS

This application claims priority to U.S. Provisional Application No. 61/664,465, filed Jun. 26, 2012, entitled "Systems, Methods and Apparatuses for the Application-Specific Identification of Devices," the content of which is incorporated herein by reference in its entirety.

FIELD OF THE DISCLOSURE

The systems, methods and apparatuses described herein relate to authenticating electronic devices to applications running on those devices while preserving device and user privacy.

BACKGROUND

For many years, the processors within computing devices, such as laptops, smartphones or tablets, have used global identifiers (IDs) to uniquely identify the device to one or more applications running on the device. Sometimes the operating system will also have this type of global ID. When third-party applications are allowed to run within a computing environment, these applications, for a variety of legitimate reasons, typically request the IDs of the underlying hardware and/or operating system. For example, device-specific IDs may be used to combat fraud, authenticate access to beta versions of applications prior to their official release and power specific mobile advertising networks, among other reasons.

However, providing applications with a global identifier also poses significant and well-known privacy concerns. For example, global identifiers are sometimes used as authentication mechanisms for mobile networks, such as gaming networks. In such cases, if an attacker acquired a user's device-specific ID, the attacker may be able to access a multitude of other personal data, including information about a user's linked social networking site account(s), the user's email address(es) or the user's mobile phone number. Privacy concerns have caused such companies as Intel and Apple to discontinue the use of global IDs. For example, processors developed by Intel after the Pentium III family of processors have not supported processor serial numbers (PSN). As another example, Apple, Inc. began rejecting applications developed by third parties for the iOS platform that request a Unique Device Identifier (UDID).

At the present time, there is no technically and/or commercially viable method by which an application running on a computing device may have access only to its own application-specific ID and/or application-specific keypair. Currently available methods provide a single global ID for all applications, do not protect privacy from malicious applications, or rely on "security by obscurity" to enforce privacy.

What is needed are systems, methods and apparatuses for the secure, application-specific identification of devices that do not allow applications to access global device IDs or global public/private keypairs.

DETAILED DESCRIPTION

Certain illustrative aspects of the systems, apparatuses, and methods according to the present invention are described herein in connection with the following description and the accompanying figures. These aspects are indicative, however, of but a few of the various ways in which the principles of the invention may be employed and the present invention is intended to include all such aspects and their equivalents. Other advantages and novel features of the invention may become apparent from the following detailed description when considered in conjunction with the figures.

In the following detailed description, numerous specific details are set forth in order to provide a thorough understanding of the invention. In other instances, well known structures, interfaces, and processes have not been shown in detail in order not to unnecessarily obscure the invention. However, it will be apparent to one of ordinary skill in the art that those specific details disclosed herein need not be used to practice the invention and do not represent a limitation on the scope of the invention, except as recited in the claims. It is intended that no part of this specification be construed to effect a disavowal of any part of the full scope of the invention. Although certain embodiments of the present disclosure are described, these embodiments likewise are not intended to limit the full scope of the invention.

Figure 1:
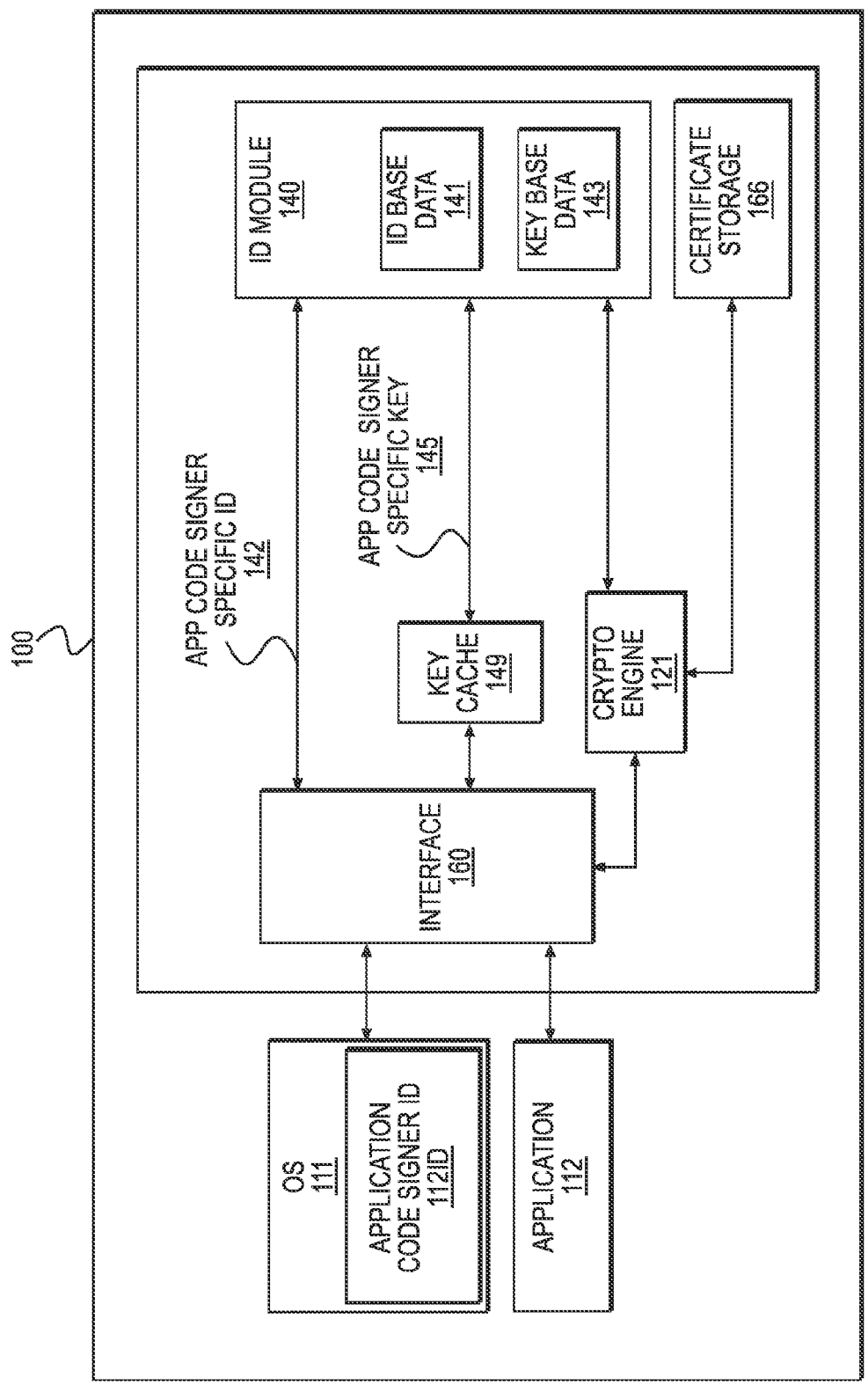
FIG. 1 is a block diagram of an exemplary system according to the present disclosure.

The present disclosure comprises systems, methods and apparatuses for the improved application-specific identification of electronic devices. FIG. 1 shows a block diagram of an exemplary computing device 100 according to the present disclosure. A suitable computing device 100 may be any form of an electronic device, such as a computer, laptop, smartphone or tablet computer.

As shown on FIG. 1, a computing device 100 may comprise one or more applications 112 or pieces of code configured to run on a central processing unit (not shown) within the computing device 100. In certain embodiments, the computing device 100 may have an operating system 111, wherein the one or more applications 112 run within the context of the operating system 111. In other embodiments, applications 112 may be run without an operating system (e.g., as described with respect to U.S. Provisional Patent Application No. 61/623,861, entitled "Secure Zone for Digital Communications," and filed on Apr. 13, 2012), the entirety of which is incorporated herein by reference.

A computing device 100 may further comprise an ID module 140. The ID module 140 may comprise, for example, memory capable of storing at least a "ID base data" 141 and a "Key base data" 143. Both the ID base data 141 and the Key base data 143 may be a sequence of bits of some predefined size (which may be randomly generated) that are unique for each ID module 140.

The ID module 140, as will be discussed in further detail below, also may be configured to provide application code signer-specific IDs 142 and/or application code signer-specific keypairs 145. These application code signer-specific IDs 142 and keypairs 145 may be related to the ID base data 141 or the Key base data 143 in such a manner that i) it can be definitively established that the application code signer-specific IDs 142 and the application code signer-specific keypairs 145 derive from the ID base data 141 and the Key base data 143, respectively, but ii) it is not possible to derive either the related ID base data 141 or Key base data 143 from either the application-specific ID 142 or application-specific keypair 145. The ID module 140 may further comprise hardware and/or software (not shown) to accomplish the functionality described herein.

The term "code signer" refers to the entity that has digitally signed the application 112. While the entity that develops (i.e., writes) the code is usually the entity that digitally signs the code, that is not always the case and it is not a requirement of the present disclosure. It is to be understood that a single code signer may sign multiple applications and that each application may have different versions.

An ID base data 141 may be used in a process of uniquely identifying the computing device 100 for a particular application code signer and, in certain embodiments, may be stored within non-volatile memory of the ID module 140. By way of example and not limitation, the ID base data 141 may be hardcoded in the computing device 100 at the time of manufacture, or generated when the computing device 100 is first powered-on. In these embodiments, the ID base data 141 cannot be changed. It may be desirable to ensure that the ID base data 141 cannot be extracted from the computing device 100 or otherwise compromised. For example, the memory within the ID module 140 may be tamper-resistant and/or tamper-evident. It also may be desirable to ensure that the operating system 111 and/or any applications 112 running on the computing device 100 do not have direct access to the ID base data 141 and are not allowed to read it.

Similarly, Key base data 143 may be used in a process of generating encryption keys that are unique for applications 112 signed by a specific code signer running on a specific device 100. Such unique keys may be used, for example, to deliver data to the device 100, wherein the data cannot be accessed by any other device, and even cannot be accessed by a task or application signed by any other application code signer running on the device 100. As shown in FIG. 1 and described in additional detail below, a Key base data 143 may be generated and stored within a non-volatile memory in the ID module 140. As with the ID base data 141, it may be desirable to ensure that the Key base data 143 cannot be extracted from the computing device 100 or otherwise compromised, and to ensure that the operating system 111 and/or any applications 112 running on the computing device 100 do not have access to the Key base data 143. The Key base data 143 may, but need not be generated, at the same time that the ID base data 141 is generated. In general, however, both the ID base data 141 and Key base data 143 may be generated using the same level of security (e.g., using the same quality random number generator and having the same number of bits), and should be stored and maintained using the same level of security.

As will be discussed in further detail below, when an application 112 requests to access the computing device's ID, to access the computing device's public key, or to perform an operation using a private key associated with the computing device 100, the ID module 140 may return an application code signer-specific ID 142, an application code signer-specific public key 145PUB, or may use an application code signer-specific private key 145PRIV. In certain embodiments, the computing device 100 may be configured to require each application 112 requesting an application code signer-specific ID 142 or application code signer-specific keypair 145 to be digitally signed by the application's developer or a code-signing entity in a manner that authenticates the application. If some applications 112 are allowed to run within the computing device 100 without being signed, they may not be allowed to request an application-specific ID or keypair.

Digital certificate verification is a standard feature of many operating systems and may be implemented in various ways. For example, the computing device 100 may check the digital signature provided with the relevant application 112 and the validity of the code signer's digital certificate. As will be described in greater detail below, these code signer certificates typically include a mechanism for identifying the code signer. For example, if an X.509 certificate is used, it typically contains a "distinguished name" (DN) and "common name" (CN) of the signer within the certificate. Those or any other similar field (either alone or in combination) may be used as a code signer ID 112ID for the purposes of the present disclosure.

Code signer certificates may be signed by one or more certificate authorities (CAs). This is a common method for guaranteeing the authenticity of a digital certificate. In certain embodiments, the computing device 100 may comprise memory 166 for the storage of one or more CA root certificates, which may be used to perform a typical public key infrastructure signature validation. A certificate issued under, for example, the ITU-T-X.509 standard would include a digital signature from a CA (or a certificate from another entity signed by a CA that forms a PKI or PKI-like certificate chain of potentially arbitrary length).

In certain embodiments, the computing device 100 may further comprise one or more cryptographic engines 121, which may be used, among other things, in support of code signer certificate verification. These cryptographic engines 121 may be configured to implement one or more cryptographic algorithms, such as the Rivest-Shamir-Adleman (RSA) algorithm or elliptic curve cryptography (ECC), or any other existing or future-developed algorithm. The computing device 100 may also comprise a random number generator (not shown) to provide support to cryptographic processes.

As will be discussed in further detail below, in embodiments wherein the ID module 140 is used to provide application code signer-specific keypairs 145, the computing device 100 may include an optional key cache 149. The key cache 149 may be used to cache and satisfy key requests from an application 112. If a key from the key cache is used, a key need not be requested from the ID module 140.

Figure 2:
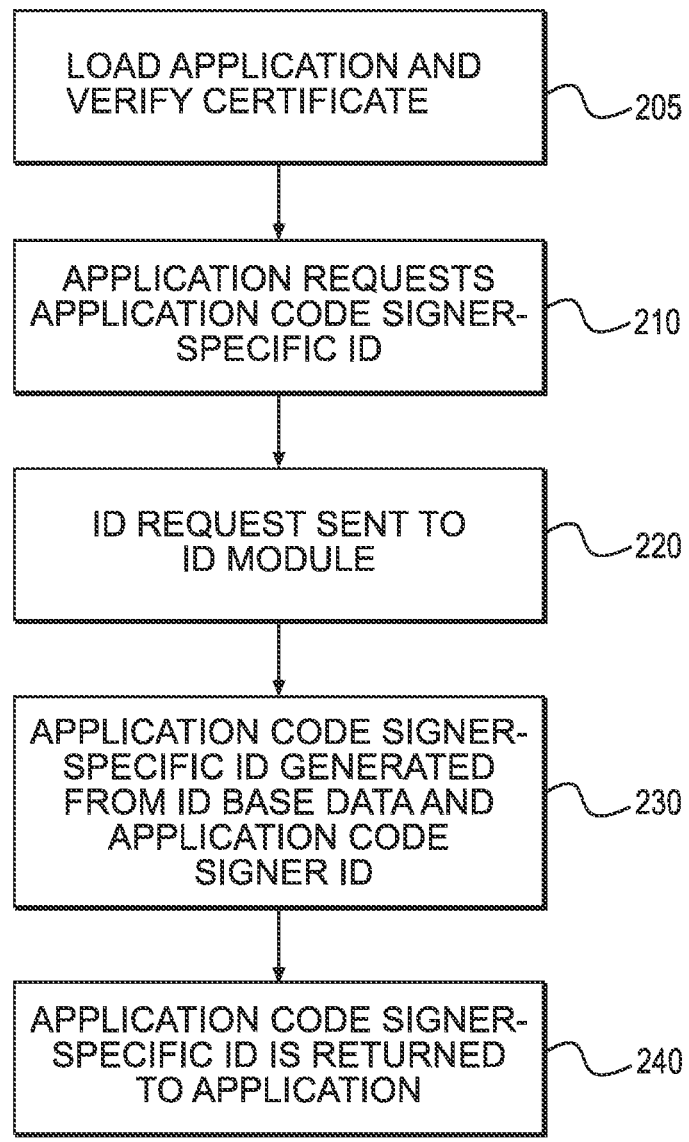
FIG. 2 if a flow diagram of exemplary method of requesting and generating application code signer-specific IDs according to the present disclosure.
Figure 3A:
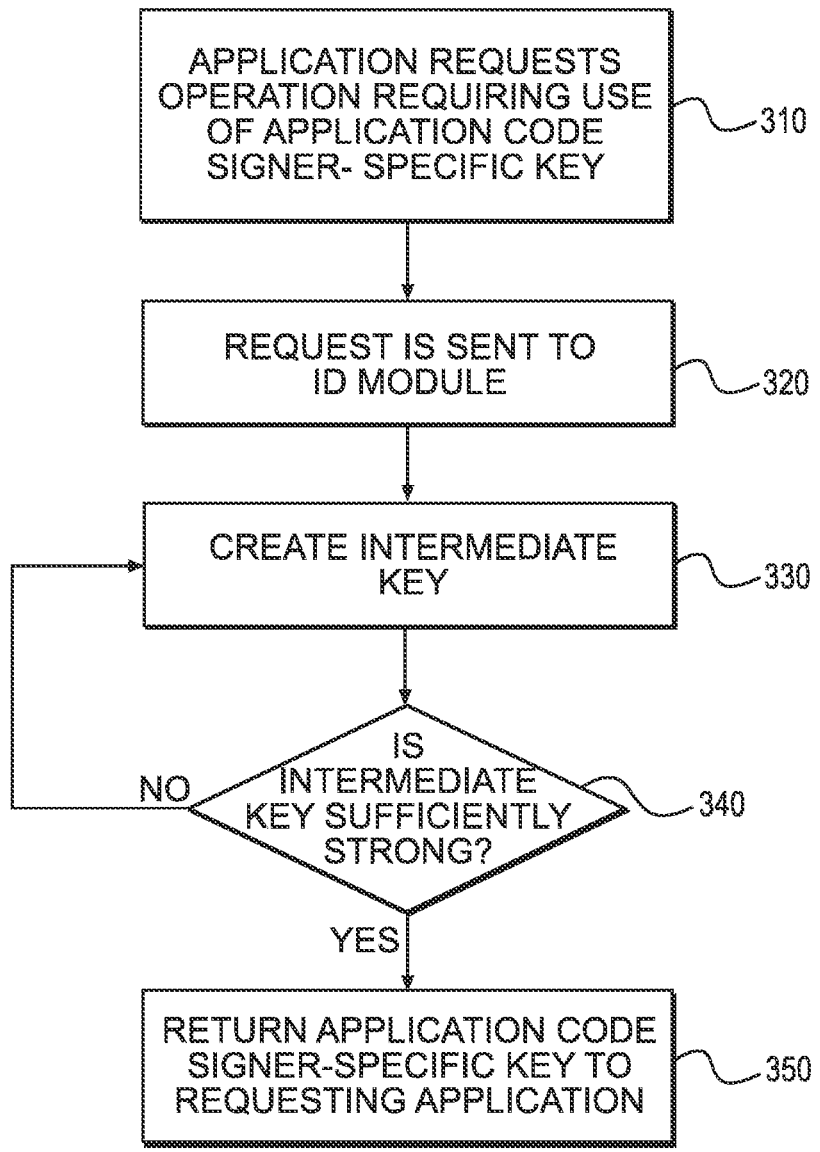
FIGS. 3A and 3B are flow diagrams of exemplary methods of requesting and generation application code signer-specific keys (or keypairs) according to the present disclosure.
Figure 3B:
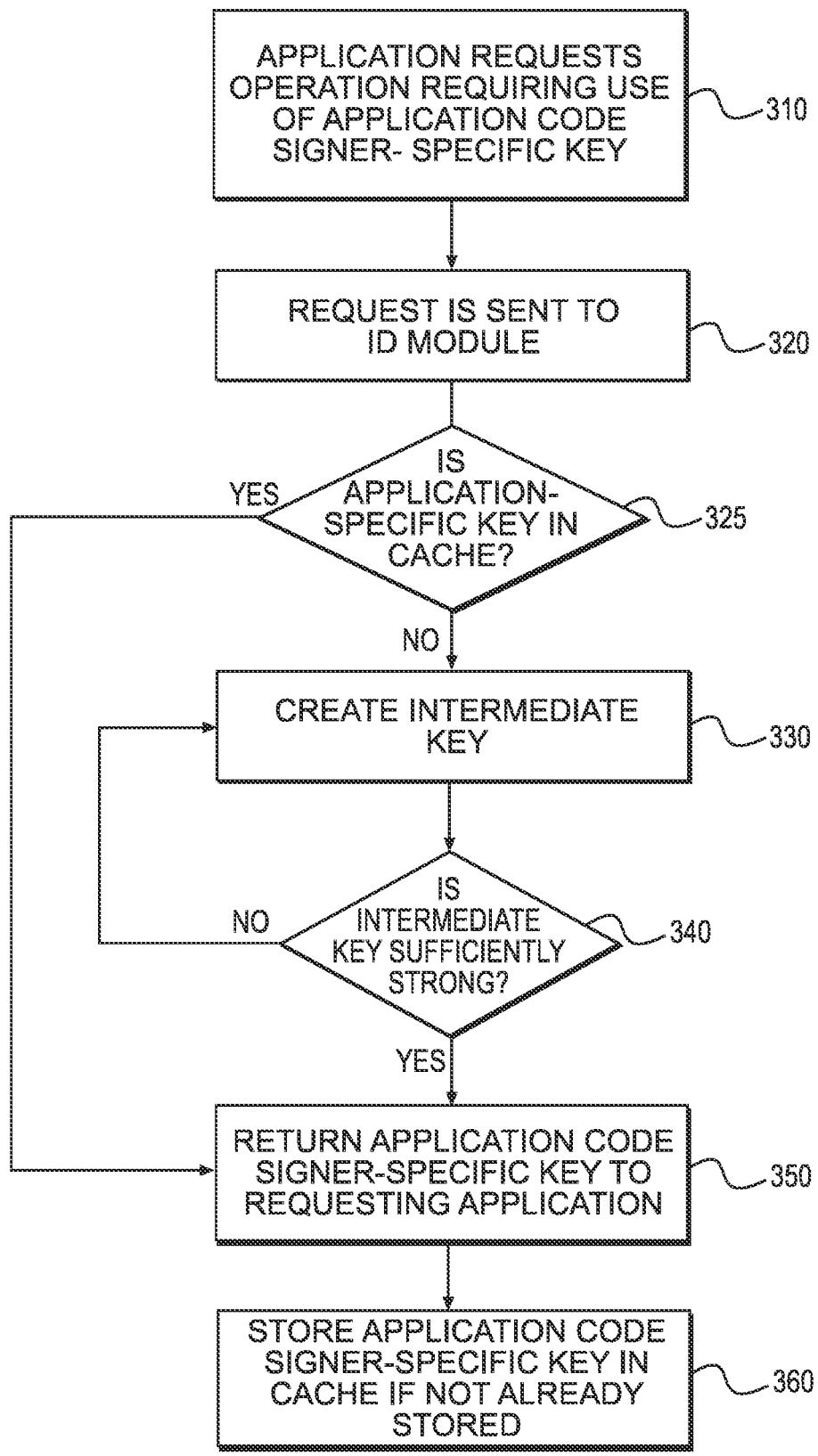

FIGS. 2, 3A and 3B show exemplary methods by which application code signer-specific IDs 142 and application code signer-specific keypairs 145, respectively, may be requested, generated and returned to an application 112 according to the present disclosure.

As shown on FIG. 2, at step 205 an application 112 may be loaded and its certificate is verified. For example, the application may be loaded and its certificate may be verified by the operating system 111. At step 210, an application 112 may issue a request for an application code signer-specific ID 142. The request may be issued to (or issued through) an interface 160. The interface 160 may be any suitable interface including, but not limited to, a combination of hardware (e.g. a bus and/or processing logic) and software.

At step 220, application code signer ID 112ID may be added to the request, and the request may be forwarded to the ID module 140. If the application 112 does not have an associated code signer ID 112ID, this request for an application code signer-specific ID 142 may fail.

At step 230, upon receipt of the request, the ID module 140 may produce an application code signer-specific ID 142 by combining the code signer ID 112ID with the ID base data 141, and calculating a one-way hash function from this combination. This ensures that the application-specific ID 142 is a random sequence of bits. In one exemplary embodiment, this may be accomplished by taking code signer ID 112ID as a string, appending a hex representation of ID base data 141 to the string, and calculating the SHA-1 hash of the resulting string. It is to be understood that this specific way of obtaining an application code signer-specific ID 142 is merely exemplary and is not intended to limit the scope of the present disclosure. One of ordinary skill in the art will know that there are numerous other combinations with similar properties.

At step 240, the application code signer-specific ID 142 may be returned to the requesting application 112 for the application's use.

The system described herein is configured such that if code signer certificates are issued to application developers, then each application developer will have access only to its own application code signer-specific ID 142 and will be unable to access the ID base data 141 or the ID of any other application developer. Thus, a specific application developer will be unable to cross-analyze its ID with the IDs from other application developers. This may mitigate certain privacy concerns related to the existence of a global ID while still serving the legitimate goals and needs of application developers. For example, the application code signer-specific ID 142 may be used to limit the number of email accounts, social networking accounts, game network accounts, etc. created from a specific computing device 100.

The methods and systems of the present disclosure may be used to ensure that secure information is only accessed by the application signed by specific code signer, for which it was intended, i.e., to prevent access (or "eavesdropping") by devices which are not intended to receive the information, and also to prevent access (or "eavesdropping") by tasks or applications signed by other code signers, that are not intended to receive the information even though they are running on the device that was intended to receive the information. For example, a remote device (e.g., a server, computer, or remote device similar or identical to the computing device 100) may send one or more messages intended to be receive and/or used by an application 112 developed by a specific code signer, which application 112 is running on the computing device 100. The one or more messages may be encrypted with the public key corresponding to the application code signer-specific private key associated with the specific code signer that signed the application 112. The application 112 on the computing device 100 that was intended to receive the one or more messages may use the application code signer-specific private key to decrypt the message. In this manner, applications by other code signers and/or devices for which the messages were not intended may be prevented from accessing (or "eavesdropping") on the messages.

In many cases, these types of operations will require the existence of an external database correlating device IDs and public keys. If each device only has one public/private keypair, i.e., the Key base data 143, then despite the use of an application code signer-specific ID 142 as a device ID, the device public key will still be unique to each device and would effectively serve as a global ID. All of the privacy concerns associated with global IDs would thus still exist if the device can be identified through a unique public key.

Accordingly, it may be desirable, in certain embodiments, to also provide application code signer-specific keypairs 145. FIG. 3A shows an exemplary method by which an application code signer-specific keypair 145 may be requested, generated and returned to an application 112 according to the present disclosure. For the purposes of the present disclosure, it is assumed that the application has already been loaded and its certificate verified. If this has not occurred, a step similar to step 205 in FIG. 2 may be performed before proceeding with the method of FIG. 3A.

At step 310, an application 112 may request a cryptographic operation. For example, the application 112 may request its public key, or may request to encrypt or decrypt a message using its private key.

At step 320, application code signer ID 112ID may be added to the request and the request may be forwarded to the ID module 140. If different cryptographic algorithms may be used, the request may also include an identification of the specific cryptographic algorithm that should be used. If the application 112 does not have an associated code signer ID 112ID, this request may fail.

At step 330, the ID module 140 may produce an intermediate signer application code signer-specific key. In one exemplary embodiment, this intermediate key may be produced by taking the code signer ID 112ID, combining it with the Key base data 143, optionally adding a "cryptographic salt," and then calculating a one-way hash of the resultant combination. As with the application code signer-specific ID described above, the intermediate key is a random sequence of bits.

Unlike IDs, however, in cryptography, certain sequences of bits are known to provide weaker or stronger encryption keys depending on the cryptographic algorithm used. Thus, for any given intermediate key, there is a probability that it may be a "weak" key for the specific cryptographic algorithm being used. The term "weak key" is used broadly to mean any key that is unsuitable for the specific cryptographic algorithm being used. For example, if the RSA algorithm is being used, an "intermediate key" that does not represent two prime numbers may be considered a "weak key" for the purposes of present disclosure.

At step 340, intermediate keys which would be weak for purposes of the encryption algorithm being used may be screened. Specifically how this screening process is accomplished may depend on the specific cryptographic algorithm being used. For example, for the DES algorithm, there is a list of 16 currently known "weak" and "semi-weak" keys; for the RSA algorithm any key that is not a pair of prime numbers may be considered "weak." It should be noted that there are cryptographic algorithms for which there are no currently known weak keys and for which step 340 may always result in a 'yes' answer based on current cryptographic knowledge. If it is determined that the intermediate application code signer-specific key is weak for the crypto-algorithm in use (which is either pre-defined, or identified in the request in step 320), then the ID module 140 may repeat step 330 using a different "cryptographic salt" to produce the intermediate application code signer-specific key. Once the intermediate key is strong enough to pass step 340, at step 350 it may become an application code signer-specific key 145 and may be returned to application 112.

In some embodiments, the cryptographic salt may be replaced with (or complemented by) the use of a different portion of the Key base data 143 on each iteration. In such embodiments, Key base data 143 should be longer than the minimum length required to generate a key for the pre-defined crypto-algorithm.

How a cryptographic salt is produced (or changed) at each performance of step 330 may be accomplished in any suitable manner known to one having ordinary skill in the art or developed in the future. For example, the cryptographic salt may be an integer which is incremented each time step 330 is performed, or it may be a pseudo-random number initiated, for example, with a function of the code signer ID 112ID.

In some embodiments, instead of producing a cryptographic salt, appending it to code-signer ID 112ID, and using the hash to produce an intermediate key, some kind of a cryptographically secure pseudo-random generator (for example, a Blum-Blum-Shub generator)—initiated, for example, with a function of code signer ID 112ID—may be used as a source of intermediate keys.

It will be understood by one having ordinary skill in the art that, in embodiments wherein the application code signer-specific key 145 is actually an asymmetric keypair, it may be preferable that applications 112 not be allowed to receive the private key 145PRIV. If an application 112 requires use of the private key 145PRIV, the private key 145PRIV may instead be forwarded to the cryptographic engine 121, which may return the resultant ciphertext to the application 112 without revealing the private key 145PRIV.

In the present disclosure, the application code signer-specific key is deterministic. In other words, regardless of whether a cryptographic salt, a portion of the Key base data 143, or a pseudo-random generator is used, and regardless of whether the generated key 145 is actually an asymmetric keypair, each time an application 112 requests the use of its private key, the same signer-specific key 145 should be returned. However, the process of obtaining the same key may vary in different embodiments.

In one embodiment, the ID module 140 may not be required to actually store the application code signer-specific key 145 in memory. It can be generated each time an application 112 requests access to its key 145. This can improve the overall security of the system and/or reduce storage requirements.

However, it will be understood that, depending on the nature of the application 112, this process may be repeated frequently, which may degrade overall system performance. For example, steps 330-350 (described above, with respect to FIG. 3) of producing an intermediate application-specific key 145, testing its cryptographic strength, and repeating until a suitable key is found, may be time-intensive. Therefore, in some embodiments, the computing device 100 may comprise a key cache 149. This key cache 149 is an optimization feature that reduces the time necessary to satisfy application requests.

FIG. 3B shown an exemplary method by which an application-specific keypair 145 may be requested, generated and returned to an application 112 in an embodiment incorporating a key cache 149. This method is similar to that depicted in FIG. 3A, except that this method includes an additional step 325 in which, before the request for an application-specific key is sent to the ID module 140, the key cache 149 is checked to determine whether an application-specific key pair 145 corresponding to the requesting application 112 is already stored in the key cache. If so, there is no need for steps 330 and 340 to be repeated, and the method proceeds to step 350 whereby the application-specific key corresponding to the requesting application 112 is returned to that application. Additionally, at step 360, the private key 145 is stored in the key cache if it is not already stored there. It should be noted that while in embodiment illustrated in FIG. 3B, the sequence of operations may differ from one run to another, the key that is returned at the end of the method remains deterministic and depends on the Key base data 143 and the code signer ID 112ID.

Depending on the overall system needs, a variety of cryptographic algorithms may be used. For the purposes of application code signer-specific key 145 generation, it may be desirable to choose crypto-algorithms with lower probabilities of a random bit sequence being considered a weak key. As such, it will be understood that ECC may be preferable to RSA, for example.

While the foregoing systems and methods have been described with respect to an application code signer-specific ID and application code singer-specific keypairs, it is within the scope of the present disclosure to generate and use an ID and/or keypair that is unique to a specific application which may be referred to, for example, as an application-specific ID and an application-specific keypair. An application-specific ID, therefore, may be used to uniquely identify different applications from the same developer or code signer, and an application-specific keypair may be used exclusively by a specific application from a specific code signer. Going further, it is also within the scope of the present disclosure to generate and use an application version-specific ID and/or an application version-specific keypair. An application version-specific ID and keypair may be used to uniquely identify a specific version of an application from a specific developer or code signer. In these alternative embodiments, instead of a code signer ID 112ID, the systems and methods may instead use an application ID or an application version ID as appropriate.

We note that the specific uses of encryption in the systems and methods described herein are but one possible embodiment. Depending on the overall system constraints and capabilities of the various apparatuses, it may be possible to substitute symmetric encryption for asymmetric encryption and vice versa. The specific combination of symmetric key or public/private key cryptography to use to implement a system according to the present disclosure is a matter of implementation choice governed by issues, such as the processing power available to perform encryption/decryption and the importance of speed in accomplishing encryption/decryption. It should also be noted that the methods described in FIGS. 3A and 3B may also be used to provide symmetric keys instead of, or in addition to, asymmetric key pairs.

It should also be noted that whenever encryption of some content with an asymmetric key (i.e., a public or private) key is mentioned within the present disclosure, it can be either implemented as direct encryption with the asymmetric key, or, alternatively, by generating a temporary crypto-safe symmetric key, encrypting the content with this temporary symmetric key, and encrypting the temporary symmetric key with an asymmetric key. Then, the encrypted content will include both content encrypted with the temporary symmetric key, as well as the temporary symmetric key encrypted with the asymmetric key. This is a standard technique in cryptography used for optimization purposes when, for example, it may not be desirable to encrypt large amounts of data using asymmetric encryption because of limited system resources (it being understood that asymmetric encryption is generally slower and more resource-intensive than symmetric encryption).

It is also to be understood that the embodiments disclosed herein may be implemented within a secure computing zone. Such a secure zone could be implemented through the operating system itself if the operating system is sufficiently secure, or it may be implemented using a hardware-based secure zone. One exemplary hardware-based secure zone is described in U.S. Provisional Patent Application No. 61/623,861, entitled "Secure Zone for Digital Communications," and filed on Apr. 13, 2012 (the entirety of which is incorporated herein by reference).

It is also to be understood that the embodiments described herein may be implemented with any operating system which supports code signing. One such exemplary operating system is the iOS operating system developed by Apple, Inc.

While specific embodiments and applications of the present invention have been illustrated and described, it is to be understood that the invention is not limited to the precise configuration and components disclosed herein. The terms, descriptions and figures used herein are set forth by way of illustration only and are not meant as limitations. Various modifications, changes, and variations which will be apparent to those skilled in the art may be made in the arrangement, operation, and details of the apparatuses, methods and systems of the present invention disclosed herein without departing from the spirit and scope of the invention. By way of non-limiting example, it will be understood that the block diagrams included herein are intended to show a selected subset of the components of each apparatus and system, and each pictured apparatus and system may include other components which are not shown on the drawings. Additionally, those with ordinary skill in the art will recognize that certain steps and functionalities described herein may be omitted or re-ordered without detracting from the scope or performance of the embodiments described herein.

The various illustrative logical blocks, modules, circuits, and algorithm steps described in connection with the embodiments disclosed herein may be implemented as electronic hardware, computer software, or combinations of both. To illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality can be implemented in varying ways for each particular application—such as by using any combination of microprocessors, microcontrollers, field programmable gate arrays (FPGAs), application specific integrated circuits (ASICs), and/or System on a Chip (SoC)—but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

What is claimed is:

1. An apparatus, comprising:
a non-volatile storage storing device specific identifier (ID) base data; and
a processor configured to:
   validate a certificate of an application being executed on the apparatus, the certificate containing a code signer ID for a code signer of the application;
   receive a request for a device specific unique ID of the application;
   generate the device specific unique ID from the code signer ID and the device specific ID base data; and
   return the generated device specific unique ID.

2. The apparatus of claim 1, wherein the request for the device specific unique ID is received from the application and wherein the generated device specific unique ID is returned to the application.

3. The apparatus of claim 1, wherein the device specific unique ID is generated by combining the code signer ID and device specific ID base data and calculating a one-way hash function from the combination.

4. The apparatus of claim 3, wherein the device specific unique ID is generated by taking the code signer ID as a string, appending the device specific ID base data to the string, and calculating a hash of the resulting string.

5. The apparatus of claim 1, wherein the non-volatile storage also stores device specific key base data and the processor is further configured to:
   receive a request for a cryptographic operation from the application;
   generate an encryption key from the code signer ID and the device specific key base data;
   perform the requested cryptographic operation using the generated encryption key; and
   return a result of the requested cryptographic operation to the application.

6. An apparatus, comprising:
a non-volatile storage storing device specific key base data; and
a processor configured to:
   validate a certificate of an application being executed on the apparatus, the certificate containing a code signer identifier (ID) for a code signer of the application;
   receive a request for a cryptographic operation; and
   generate an encryption key from the code signer ID and the device specific key base data.

7. The apparatus of claim 6, wherein the request for the cryptographic operation is received from the application.

8. The apparatus of claim 6, wherein the requested cryptographic operation is to encrypt or decrypt a message using a private key.

9. The apparatus of claim 6, wherein the requested cryptographic operation is to encrypt or decrypt a message using a symmetric key.

10. The apparatus of claim 6, wherein the encryption key is generated by combining the code signer ID with the device specific key base data, adding a cryptographic salt, and then calculating a one-way hash of the resultant combination.

11. The apparatus of claim 10, wherein the processor is further configured to:
   determine that the generated encryption key is weak;
   generate another encryption key using a different cryptographic salt if the encryption key is determined to be weak; and
   determine whether the newly generated encryption key is weak.

12. The apparatus of claim 6, wherein the processor is further configured to:
   perform the requested cryptographic operation using the generated encryption key; and
   return a result of the requested cryptographic operation to the application.

13. The apparatus of claim 6, wherein the processor is further configured to return a public key of a public/private key pair to the application.

14. The apparatus of claim 6, further comprising a key cache to store already generated encryption key(s).

15. The apparatus of claim 14, wherein the processor is further configured to search the key cache to determine whether an encryption key needed for the requested cryptographic operation is already stored in the key cache.

16. The apparatus of claim 6, wherein the non-volatile storage also stores device specific ID base data and the processor is further configured to:
    receive a request for a device specific unique ID of the application;
    generate the device specific unique ID from the code signer ID and the device specific ID base data; and
    return the generated device specific unique ID to the application.

17. A computer-implemented method, comprising:
    storing, in a non-volatile storage of an apparatus, device specific identifier (ID) base data;
    validating a certificate of an application being executed on the apparatus, the certificate containing a code signer ID for a code signer of the application;
    receiving a request for a device specific unique ID of the application;
    generating the device specific unique ID from the code signer ID and the device specific ID base data; and
    returning the generated device specific unique ID.

18. The computer-implemented method of claim 17, wherein the request for the device specific unique ID is received from the application and wherein the generated device specific unique ID is returned to the application.

19. The computer-implemented method of claim 17, wherein generating the device specific unique ID includes combining the code signer ID and device specific ID base data and calculating a one-way hash function from the combination.

20. The computer-implemented method of claim 19, wherein generating the device specific unique ID includes taking the code signer ID as a string, appending the device specific ID base data to the string, and calculating a hash of the resulting string.

21. The computer-implemented method of claim 17, further comprising:
    storing, in the non-volatile storage, device specific key base data;
    receiving a request for a cryptographic operation from the application;
    generating an encryption key from the code signer ID and the device specific key base data;
    performing the requested cryptographic operation using the generated encryption key; and
    returning a result of the requested cryptographic operation to the application.

22. A computer-implemented method, comprising:
    storing, in a non-volatile storage of an apparatus, device specific key base data;
    validating a certificate of an application being executed on the apparatus, the certificate containing a code signer ID for a code signer of the application;
    receiving a request for a cryptographic operation; and
    generating an encryption key from the code signer ID and the device specific key base data.

23. The computer-implemented method of claim 22, wherein the request for the cryptographic operation is received from the application.

24. The computer-implemented method of claim 22, wherein the requested cryptographic operation is to encrypt or decrypt a message using a private key.

25. The computer-implemented method of claim 22, wherein the requested cryptographic operation is to encrypt or decrypt a message using a symmetric key.

26. The computer-implemented method of claim 22, wherein generating the encryption key includes combining the code signer ID with the device specific key base data, adding a cryptographic salt, and then calculating a one-way hash of the resultant combination.

27. The computer-implemented method of claim 26, further comprising:
    determining that the generated encryption key is weak;
    generating another encryption key using a different cryptographic salt if the encryption key is determined to be weak; and
    determining whether the newly generated encryption key is weak.

28. The computer-implemented method of claim 22, further comprising:
    performing the requested cryptographic operation using the generated encryption key; and
    returning a result of the requested cryptographic operation to the application.

29. The computer-implemented method of claim 22, further comprising returning a public key of a public/private key pair to the application.

30. The computer-implemented method of claim 22, further comprising storing already generated encryption key(s) in a key cache of the apparatus.

31. The computer-implemented method of claim 30, further comprising searching the key cache to determine whether an encryption key needed for the requested cryptographic operation is already stored in the key cache.

32. The computer-implemented method of claim 22, further comprising:
    storing, in the non-volatile storage, device specific ID base data;
    receiving a request for a device specific unique ID of the application;
    generating the unique ID from the code signer ID and the device specific ID base data; and
    returning the generated device specific unique ID to the application.

* * * * *